United States Patent [19]

Tait

[11] Patent Number: 5,553,142
[45] Date of Patent: Sep. 3, 1996

[54] AUDIO RECOVERY FROM SCRAMBLED VIDEO IN A CABLE COMPATIBLE TELEVISION RECEIVER

[75] Inventor: David S. Tait, Wood Dale, Ill.

[73] Assignee: Zenith Electronics Corporation, Glenview, Ill.

[21] Appl. No.: 385,858

[22] Filed: Feb. 8, 1995

[51] Int. Cl.$^6$ ................................................ H04N 7/167
[52] U.S. Cl. .................................... 380/19; 348/500
[58] Field of Search ............................... 380/19; 358/142

[56] References Cited

U.S. PATENT DOCUMENTS

| | | | |
|---|---|---|---|
| 4,636,853 | 1/1987 | Forbes et al. | 380/19 |
| 4,654,705 | 3/1987 | Forbes et al. | 380/19 |
| 4,939,780 | 7/1990 | Ohtsubo | 380/19 |
| 5,091,936 | 2/1992 | Katznelson et al. | 380/19 |
| 5,278,907 | 1/1994 | Snyder et al. | 380/19 |

*Primary Examiner*—David C. Cain

[57] ABSTRACT

A cable ready television receiver includes a set back decoder that communicates with the microprocessor in the television receiver via its own microprocessor. A synchronous demodulator in the television receiver is operated normally for unscrambled television signals and is operated to quadrature demodulate scrambled television signals. The quadrature demodulation develops only high frequency video, modulated chroma, FM modulated audio and DC. The demodulator output is applied to the audio circuit and to the AGC circuit in the television receiver. A descrambler in the decoder develops the video signal for application to the video circuitry in the television receiver.

8 Claims, 1 Drawing Sheet

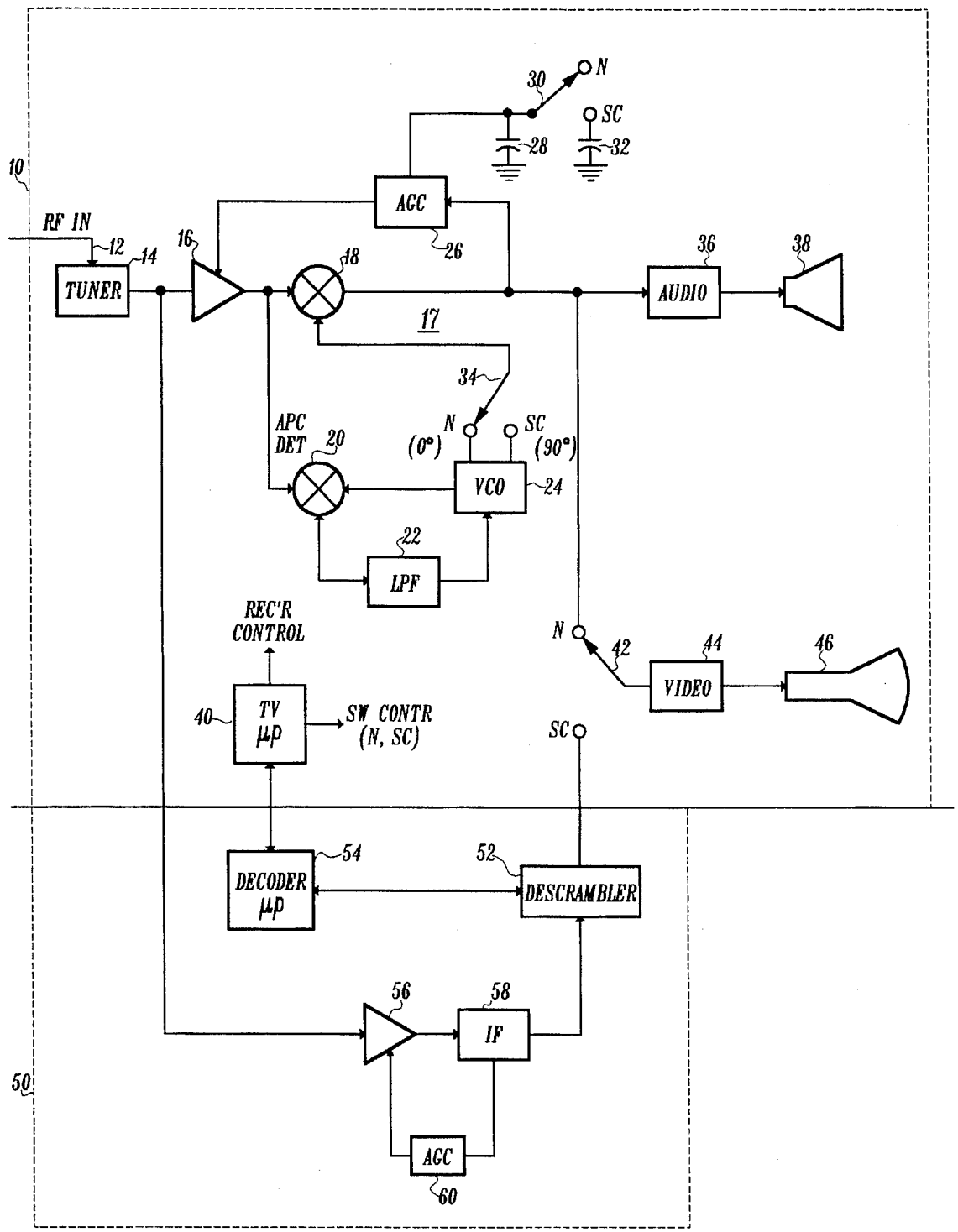

5,553,142

AUDIO RECOVERY FROM SCRAMBLED VIDEO IN A CABLE COMPATIBLE TELEVISION RECEIVER

BACKGROUND OF THE INVENTION AND PRIOR ART

This invention relates generally to cable television receiver systems and particularly to cable systems that receive both scrambled and unscrambled television signals. Recently the EIA (Electronics Industries Association) has proposed a color interface standard IS105 which defines certain requirements for cable compatible television receivers. Specifically, the proposed standard requires that a cable decoder, which is called a set back box, be interfaced in a particular way with the television receiver for performing prescribed tasks. The interface is a combination of IF/AGC, digital control and baseband audio/video lines required to interconnect cable-ready devices and cable decoders. The decoder is external to the television receiver (or cable-ready device) and is connected to it via the interface. The decoder may include a descrambler that enables the user to recover scrambled television signals or other encrypted services. Both the television receiver and the decoder include microprocessors for controlling their various respective operations. The decoder interface is also connected to the receiver via a control line to enable the two microprocessors to "talk to" each other.

A very common form or video scrambling involves suppression of synchronizing signals (sync) and random inversion of video. Generally the audio signal, which is FM modulated, is not affected. In most television receivers difficulties arise because the television receiver, when receiving a scrambled video signal, is unable to restore the sync to its proper level which is the basis for developing the AGC signal. During scrambled signal reception, the video signal is provided by the set back decoder. Switching means are provided for delivering the video from the receiver or decoder as appropriate. The audio generally is delivered from the receiver in all cases.

A difficulty arises in developing the audio signal in the television receiver when a scrambled video signal is received. This is because the television receiver AGC system cannot effectively control the signal level when the signal is scrambled. Even though the audio is an FM modulation signal, certain signal conditions create audio dropouts and very unusual noises which can be very annoying. The present invention provides a relatively simple, cost effective method of properly developing the audio signal in the television receiver under conditions where the decoder is supplying the video signal.

OBJECTS OF THE INVENTION

A principal object of the invention is to provide an improved cable compatible television system.

Another object of the invention is to provide a cable compatible television receiver that exhibits improved audio performance when receiving scrambled video signals.

BRIEF DESCRIPTION OF THE DRAWINGS

These and other objects and advantages of the invention will be apparent upon reading the following description in conjunction with the drawing, the single FIGURE of which is a partial block diagram of a television receiver and decoder constructed in accordance with the invention.

DESCRIPTION OF THE PREFERRED EMBODIMENT

Referring to the drawing, the dashed line box 10 indicates a television receiver and the dashed line box 50 indicates a decoder. The receiver 10 and the decoder 50, while separate, are interconnected with each other as indicated by the horizontal line. An RF input signal received via a cable 12 is applied to a tuner 14 that in turn supplies an IF amplifier 16. The output of IF amplifier 16 is coupled to a synchronous demodulator 17 consisting of a pair of multipliers 18 and 20, a low pass filter 22 and a VCO (voltage controlled oscillator) 24. Multiplier 20 operates as an AFC detector in this circuit. A switch 34 is included between the output of VCO 24 and multiplier 18. Switch 34 has two positions labelled N and SC, with N connoting normal signal reception and SC connoting scrambled signal reception. These positions are also identified by the legends 0° and 90° representing the demodulation axes of VCO 24. The output of multiplier 18 is supplied to an audio processing circuit 36 that in turn supplies a loudspeaker 38. The multiplier output is also connected to an AGC system 26 that is connected back to IF amplifier 16. The AGC system 26 includes a capacitor 28, and a switch 30 having N and SC positions for connecting another capacitor 32 in parallel with capacitor 28. The parallelling of capacitors 28 and 32 increases the time constant of AGC circuit 26.

The output of multiplier 18 includes the detected video signal, a chroma signal, the FM modulated audio signal and a DC component. This output is supplied to a terminal N of a switch 42, the common element of which is coupled to a video processor 44 which in turn supplies a color cathode ray tube (CRT) 46. A microprocessor 40 in the television receiver performs various receiver control functions and generates appropriate switching signals and is in communication with a microprocessor 54 in decoder 50.

The IF signal output of tuner 14 is also applied to an IF amplifier 56 that in turn is coupled to an IF section 58 which develops a separate AGC potential via an AGC circuit 60 for controlling amplifier 56. The output of IF section 58 is applied to a descrambler 52 that is controlled by decoder microprocessor 54 for supplying a descrambled video signal to the SC terminal of switch 42.

In operation, assuming a normal (unscrambled) signal is being received by tuner 14, the synchronous demodulator 17 develops an output signal that includes a double side band video signal, a (single side band) subcarrier chroma signal, a (single side band) 4.5 MHz FM modulated audio signal and a DC component. The audio signal is demodulated and processed in audio processor 36 and the developed audio is applied to loudspeaker 38. The video signal is applied to video processor 44 (via switch 42) which develops video signals for CRT 46. The AGC circuit 26 clamps to the level of the sync tips in the video signal for controlling IF amplifier 16 in a well known manner. It will be appreciated that there is also a delayed AGC signal supplied to tuner 14 which is not shown. In the configuration illustrated, that is with the 0° or N terminal of VCO 24 selected for synchronous demodulator 17, the full video spectrum of low and high frequency video, chroma and audio signals is developed.

For scrambled signals, descrambler 52 is rendered operational in a well known manner in response to a flag in the received television signal. Microprocessor 54 in the decoder signals microprocessor 40 in the television receiver to position the switches 30, 34 and 42 in their SC positions. The descrambler descrambles the signal and a baseband video signal is applied to the SC terminal of switch 42. When the switches are in their SC positions, the 90° demodulation axis of VCO 24 is selected for synchronous demodulator 17. Consequently, quadrature demodulation occurs with the result that the double side band information is ignored, while the single side band information is detected. As mentioned, the double side band information comprises the low frequency video. The chroma signal, FM modulated audio signal and high frequency video signals, being single side band due to the nature of the NTSC type signal transmission, are developed by the quadrature demodulation. Therefore, the output of synchronous demodulator 17 comprises the high frequency portion of the video along with modulated chroma, modulated audio and DC. The FM modulated audio signal is relatively immune to the small variations in video signal amplitude and for practical purposes is not affected. Similarly, the information applied to the AGC circuit 26 is relatively stable since the major portions of the randomly inverted video and the suppressed syncs are not recovered. Consequently, stability is provided for the IF amplifier 16. Thus, in the presence of scrambled signal, the video is provided from the decoder 50 whereas the audio and IF for the television receiver are developed from the quadrature detection mode of synchronous demodulator 17.

Also, switch 30 is operated to increase the time constant of AGC circuit 26 and render it less responsive to variations in signal level. Thus, for example, instead of developing the AGC on a line basis, it may be developed on a field basis.

What has been described is a novel compatible television/decoder arrangement that eliminates some of the problems of audio degradation when receiving a scrambled television signal. It is recognized that numerous changes in the described embodiment of the invention will be apparent to those skilled in the art without departing from its true scope and spirit. The invention is to be limited only as defined in the claims.

What is claimed is:

1. A method of operating a television receiver and a decoder for selectively generating a video signal and an audio signal from scrambled and unscrambled television signals, comprising:

operating a demodulator to develop said audio signal and said video signal from said unscrambled television signal;

operating said demodulator to develop substantially only said audio signal from said scrambled television signal; and operating said decoder to develop said video signal from said scrambled television signal.

2. The method of claim 1 wherein said demodulator is operated in quadrature to develop substantially only said audio signal.

3. The method of claim 2 further including increasing the time constant of the AGC circuit of said television receiver when recovering said scrambled television signal.

4. In combination with a television receiver and a decoder receiving scrambled and unscrambled television signals:

demodulating means for developing an audio signal and a video signal from an unscrambled television signal;

descrambling means for developing a video signal from a scrambled television signal; and means for changing the operation of said demodulating means for developing substantially only said audio signal from said scrambled television signal.

5. The combination of claim 4 wherein said demodulating means includes a voltage controlled oscillator and wherein said changing means shifts the axis of demodulation of said voltage controlled oscillator by 90°.

6. The combination of claim 5 further including AGC means responsive to said demodulating means for developing an AGC signal for said television receiver; and means for increasing the time constant of said AGC means when said descrambling means is active.

7. In combination with a television receiver and a decoder for recovering scrambled and unscrambled television signals;

demodulating means including a voltage controlled oscillator for developing an audio signal and a video signal from an unscrambled television signal;

descrambling means for developing a video signal from a scrambled television signal; and means for shifting the axis of demodulation of said voltage controlled oscillator by 90° for developing substantially only said audio signal from said scrambled television signal.

8. The combination of claim 7 further including AGC means responsive to said demodulating means for developing an AGC signal for said television receiver; and means for increasing the time constant of said AGC means when said descrambling means is active.

* * * * *